(12) United States Patent
Gresch et al.

(10) Patent No.: US 10,524,403 B2
(45) Date of Patent: Jan. 7, 2020

(54) METHOD FOR DETERMINING A WEIGHT OF A PAYLOAD FOR A UTILITY VEHICLE

(71) Applicant: Deere & Company, Moline, IL (US)

(72) Inventors: Valentin Gresch, Ensheim (DE); Martin Kremmer, Ensheim (DE); Ramon Isele, Weinheim (DE)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 15/794,349

(22) Filed: Oct. 26, 2017

(65) Prior Publication Data
US 2018/0116096 A1    May 3, 2018

(30) Foreign Application Priority Data

Oct. 28, 2016   (DE) ........................ 10 2016 221 321

(51) Int. Cl.
| | | |
|---|---|---|
| *A01B 63/118* | (2006.01) | |
| *G01G 19/12* | (2006.01) | |
| *G01L 5/10* | (2006.01) | |
| *G01L 5/16* | (2006.01) | |
| *A01B 59/06* | (2006.01) | |
| *A01B 63/102* | (2006.01) | |

(52) U.S. Cl.
CPC .......... *A01B 59/069* (2013.01); *A01B 59/065* (2013.01); *A01B 59/068* (2013.01); *A01B 63/118* (2013.01); *G01G 19/12* (2013.01); *G01L 5/10* (2013.01); *G01L 5/16* (2013.01); *A01B 63/102* (2013.01)

(58) Field of Classification Search
CPC ... A01B 59/065; A01B 63/118; A01B 59/069; A01B 59/068; A01B 63/102; G01L 5/10; G01L 5/16; G01G 19/12; G01G 19/083
USPC .......................................................... 177/136
See application file for complete search history.

(56) References Cited

U.S. PATENT DOCUMENTS

| | | | |
|---|---|---|---|
| 6,534,728 B1 | 3/2003 | Spikings | |
| 7,166,808 B2* | 1/2007 | Viaud | A01F 15/0825 177/1 |
| 7,540,524 B2* | 6/2009 | Viaud | B60D 1/248 177/136 |
| 7,816,613 B2* | 10/2010 | Kallonen | G01G 19/12 177/136 |

(Continued)

FOREIGN PATENT DOCUMENTS

| | | |
|---|---|---|
| DE | 3820757 A1 | 12/1989 |
| DE | 102014209695 A1 | 11/2015 |

(Continued)

OTHER PUBLICATIONS

European Search Report issued in counterpart application No. 17198313.3 dated Mar. 27, 2018. (9 pages).

(Continued)

*Primary Examiner* — Jacques M Saint Surin

(57) ABSTRACT

A method is provided for determining a weight of a payload carried by a support structure of an agricultural utility vehicle via a hitch. The hitch includes at least one upper link and at least one lower link. The method includes determining the weight based on at least one of (1) an angle between the upper link and a vehicle horizontal, and (2) a holding force that arises at a connection between the upper link and the payload and is effective along the upper link.

5 Claims, 3 Drawing Sheets

(56) References Cited

U.S. PATENT DOCUMENTS

| | | | | |
|---|---|---|---|---|
| 8,428,832 | B2* | 4/2013 | Marathe | E02F 9/2217 |
| | | | | 701/50 |
| 8,515,627 | B2* | 8/2013 | Marathe | E02F 9/264 |
| | | | | 701/124 |
| 9,839,177 | B2* | 12/2017 | Kowalchuk | A01C 7/107 |

FOREIGN PATENT DOCUMENTS

| | | |
|---|---|---|
| EP | 0892256 A1 | 1/1999 |
| FR | 2677119 A1 | 12/1992 |

OTHER PUBLICATIONS

Auernhammer H et al, Wiegemoeglichkeiten In Der Schlepperdreipunkthydraulik, dated Oct. 1, 1988, pp. 414-418, vol. 43, Landtechnik Landwirtschaftsverlag, Munster, DE.
European Search Report issued in counterpart application No. 102016221321.0, dated Mar. 24, 2017 (8 pages).

* cited by examiner

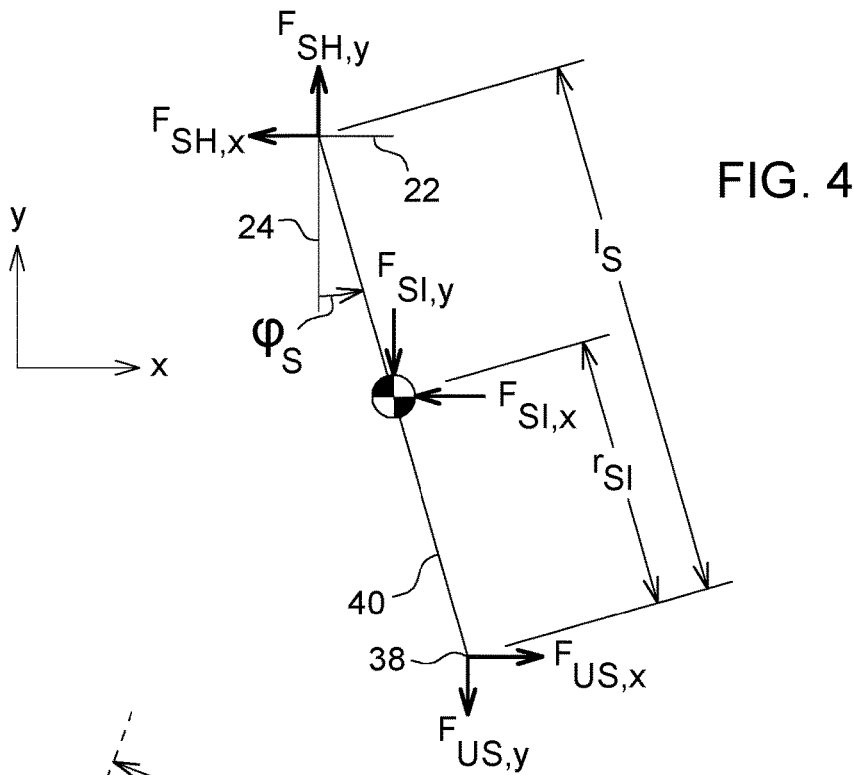
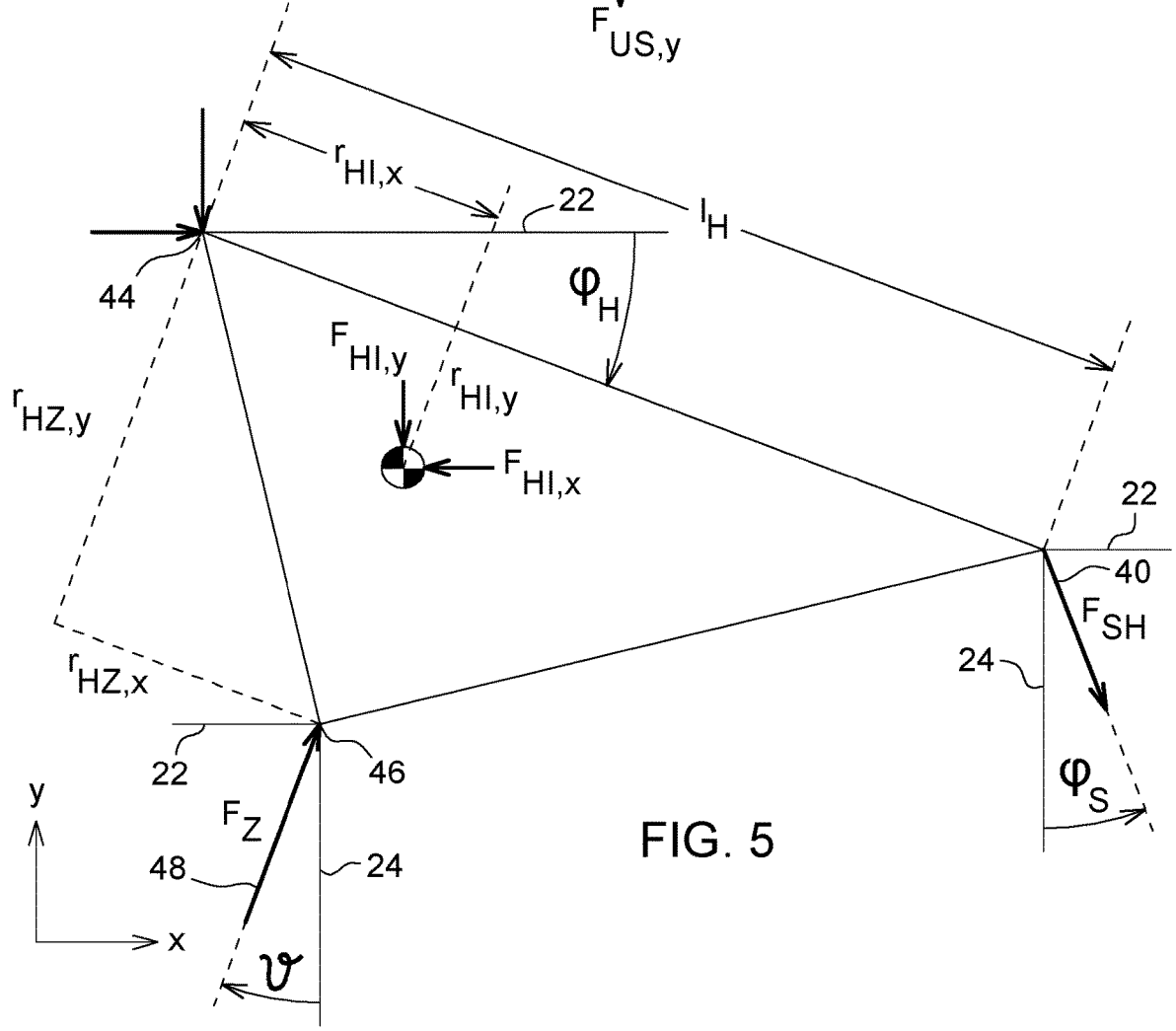

METHOD FOR DETERMINING A WEIGHT OF A PAYLOAD FOR A UTILITY VEHICLE

RELATED APPLICATIONS

This application claims priority to German Application Ser. No. 102016221321.0, filed Oct. 28, 2016, the disclosure of which is hereby expressly incorporated by reference in its entirety.

FIELD OF THE DISCLOSURE

The present disclosure relates to a method for determining a weight of a payload, and in particular, a method for determining a weight of a payload carried by a support structure via a hitch of an agricultural utility vehicle.

BACKGROUND

A device for determining the weight of loads, which is linked to a utility vehicle designed as a tractor, is known from DE 102016221321.0. A computer unit determines the size of the attached load and its change of weight based on signals received from sensors.

In this disclosure, a method for determining a weight of a payload is based on the task of being able to determine, in the case of a utility vehicle, the weight of a payload with low cost and relatively simple sensors.

SUMMARY

In one embodiment of the present disclosure, a method is provided for determining a weight of a payload in which the payload is carried by the utility vehicle or its support structure by means of a hitch that has at least one upper link and one lower link. The weight of the payload is determined on the basis of measured physical parameters on the hitch. Here, at least one of the following parameters is determined: (1) an angle $\alpha$ between the upper link and a vehicle horizontal, and (b) a holding force $F_O$ that arises at a connection between the upper link and the payload and is effective along the upper link.

Apart from the determination of at least one of the two said parameters, appropriate calculation rules can also be established, from which the weight results. The structure of the hitch that is used (for example rear hitch) or various physical parameters at the hitch are taken into account in the calculation rules. Advantageously, at least one of the following physical parameters, apart from at least one of the two parameters noted above, is also taken into account in the calculation rules, in each case according to the sensor concept that is used: (1) dynamics (in particular acceleration and/or tilting) of the support structure of the utility vehicle, (2) force or pressure in a lift cylinder of the hitch, (3) a supporting force or a pulling force at the lower link of the hitch, and (4) instantaneous height of lift of the hitch.

The physical parameters required for the determination of the weight or their contributions can be determined by means of suitable sensors, for example, tilt sensors, acceleration sensors, pressure sensors, angle sensors, or force sensing bolts. The force arising at the connection between the upper link and payload and effective along the upper link can, for example, be determined by means of pressure sensors in a hydraulic upper link. In the case of a mechanical upper link, the force can be determined, for example, by means of a biaxial force sensor (force sensing bolts). The biaxial force sensor is positioned at a connecting point, which acts as connection between the support structure and the upper link.

Overall, the weight of the payload can be determined with a small number of sensors that are available as standard products, and thus cheaply, with few physical quantities that must be detected. In some cases, the required sensors may be present on the vehicle for other purposes, so the expense in such cases for determining the weight is reduced.

The agricultural utility vehicle may be, for example, a tractor. The support structure is a supporting structure of the vehicle, for example, a frame or other bearing parts. The upper link and lower links of the hitch are mounted on the support structure so that they can pivot or are hinged in order to transfer the relevant payload to different positions if necessary.

A pivotable mounting or hinging to the support structure means that the relevant component of the hitch is mounted or hinged either directly on the support structure itself or on a component that is rigidly connected to the support structure (for example, the housing of a transmission-differential unit) of the vehicle. The hitch usually produces a multipoint linkage of the payload to the vehicle. In particular, a three-point linkage is provided in which the payload is incorporated on the support structure or hinged to the support structure by means of two lower links and an upper link.

The payload may be an implement with or without a variable cargo load (for example, sprays, material to be spread, fertilizer, seed, etc.). Based on the weight of the payload, then, it is also possible to determine its mass or the mass of the current cargo during the work of the utility vehicle or the change of the amount of cargo during the work of the utility vehicle. In the case of payloads or implements (for example, rear loaders, bale forks, silo block cutters) that are used for transport, a knowledge of the changing mass is also meaningful.

In one embodiment, only the angle $\alpha$ of the upper link and the holding power $F_O$ of the upper link are needed to determine the weight of the payload unambiguously, with the help of suitable calculation rules and any other physical data that are possibly already on hand on the utility vehicle or have already been determined.

In another embodiment, only the angle $\alpha$ of the upper link and a supporting force $F_{UM}$ arising at a connection between the lower link and payload or at least one component of force of said supporting force $F_{UM}$ need to be determined. Based on the determined values, the weight of the payload can unambiguously be determined, again with the help of suitable calculation rules and any other physical parameters that are normally already present on the utility vehicle or have already been determined.

The supporting force $F_{UM}$ or at least one of its components is determined in dependence on a tensile force $F_U$ (or a tensile force component), which arises at a connection between the lower link and the supporting structure. The tensile force or tensile force component can be determined by means of a force measuring device or a force sensing bolt.

In another variation, only the holding force $F_O$ of the upper link and the supporting force $F_{UM}$, or at least a component of said supporting force $F_{UM}$, is determined, while the angle $\alpha$ of the upper link is not measured so that the corresponding sensor system is unnecessary. Then, two possible values of the weight of the payload can be determined with the help of suitable calculation rules and any other physical parameters that are measured or are normally already present on the utility vehicle. The probable weight or mass of the payload can be determined by means of a subsequent suitable physical computation plausibility assessment.

In particular, in the last variation, at least the contribution of the holding force $F_O$ of the upper link and the contribution and direction of the supporting force $F_{UM}$ of the lower link are determined. Mathematically speaking, the possible contribution or contributions to the weight $F_a$ in a force triangle defined by the direction of action of the weight $F_a$, the supporting force $F_{UM}$, and the contribution of the holding force $F_O$ may be determined as the distance from the point of engagement of the supporting force $F_{UM}$ to an intercept on the direction of action of the weight $F_O$. In this case, the intercept is formed by the contribution of the holding force $F_O$ between the supporting force $F_{UM}$ and the direction of action of the weight $F_a$.

The determination of the weight $F_a$ or the mass derived therefrom is supported by a vehicle-related coordinate system that is defined with an x-axis directed parallel to a lengthwise direction (vehicle horizontal) of the utility vehicle and a y-axis directed parallel to a vertical direction (vehicle vertical) of the utility vehicle. Here, the x-axis and y-axis intersect at a zero point of the coordinate system. Through this, the x and y components of individual forces on the hitch or the payload that are needed for the determination of the weight can be determined unambiguously at relatively low cost.

Any tilt of the vehicle horizontal relative to the earth horizontal can be taken into account through the determination of a corresponding tilt angle, if this turns out to be necessary for certain applications.

The task is additionally solved by an arrangement for performing a method for determining a weight of a payload carried by a supporting structure of an agricultural utility vehicle via a hitch. The arrangement can, in various embodiments, contain individual or all of the sensory means or force measuring or pressure measuring devices indicated in the present disclosure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 shows a force diagram of the lift spindle on the hitch, FIG. 5 shows a force diagram of the lift arm on the hitch.

DETAILED DESCRIPTION

Figure 1:
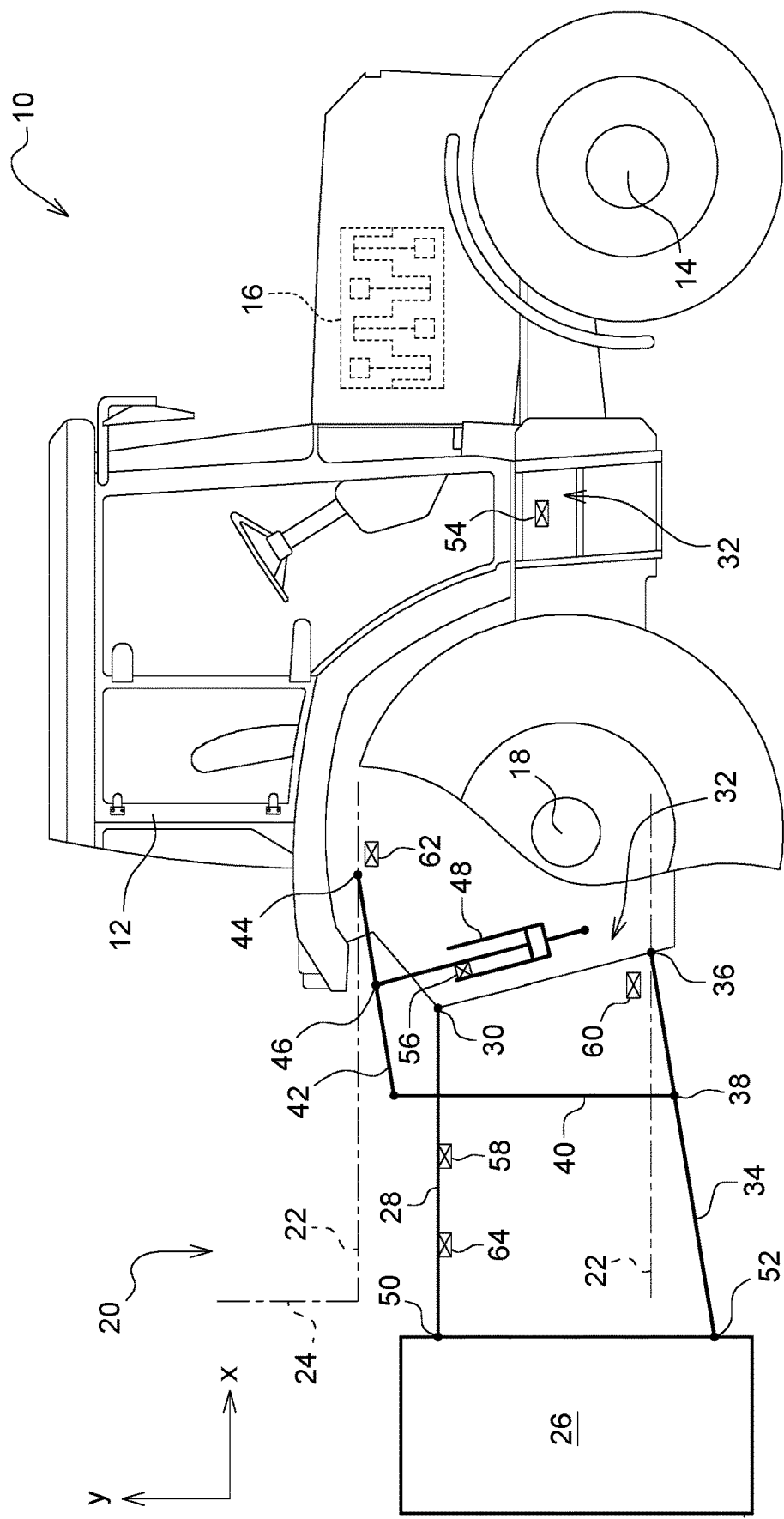
FIG. 1 shows an agricultural utility vehicle with a three-point hitch in a side view.

FIG. 1 shows an agricultural utility vehicle 10, represented only schematically in part, in the form of a tractor with a cabin 12, a front axle 14, and a combustion engine 16 to drive at least one rear axle 18. A three-point hitch 20, which is shown in principle and not to scale, is mounted at the rear region of the utility vehicle 10. Additionally or alternatively, a three-point hitch can also be mounted at the front region of the utility vehicle 10. A plane kinematic diagram is defined by the three-point hitch 20 in a plane that is designated as an x-y plane in the further drawings. Here, the x direction corresponds to a lengthwise direction of the vehicle or the vehicle horizontal 22, while the y direction corresponds to a vehicle height direction or the vehicle vertical 24. The three-point hitch 20 serves to lift or carry an implement 26, which can be called a payload.

The three-point hitch 26 includes an upper link 28, which is hinge mounted via a linkage 30 in the rear of a support structure 32 of the utility vehicle 10. Additionally, the three-point hitch 26 includes a lower link 34, which is likewise hinge mounted at the rear of the support structure 32 via a support bearing 36. The lower link 34 is connected to the one end of a lift arm 42 via a lift spindle 40 engaging in a lower link hinge 38, the lift arm being hinge connected to the support structure 32 of the utility vehicle 10 at its other end via a link 44. The lift arm 42 can be pivoted with respect to the supporting structure 32 via a hydraulic cylinder 48 supported by the supporting structure 32 and engaging in a lift arm link 46. The pivoting of the lift arm 42 by means of the hydraulic cylinder 48 is transferred to the lower link 34 via the lift spindle 40. The length of the lift spindle 40 is adjustable, so that the angles of the lift arm 42 and the lower link 34 can be adjusted with respect to each other. The upper link 28 and lower link 34 are connected to the implement 26 via an upper link articulation point 50 or a lower link articulation point 52 on the side turned away from the utility vehicle 10 in the lengthwise vehicle direction (x direction). The linkage 30 and the upper link articulation point 50 can be adjusted in the direction of vehicle height (y direction), so that the upper link 28 can take various vertical positions (not shown here) to establish a mast height.

In FIG. 1, a plurality of sensors is shown schematically and not to scale on utility vehicle 10. The sensors serve to measure or register various physical parameters at individual components of the hitch 20 in order to determine a weight or mass of the implement 26 from them.

First sensors 54 are designed as an acceleration sensor (alternatively, tilt or rotary speed sensor) affixed to the vehicle. The hydraulic pressure at lift cylinder 48 is measured by means of second sensors 56 on lift cylinder 48. In this case, before the measurement of the pressure in lift cylinder 48 to produce a defined status, a friction compensation can take place through defined, minimal travel of the cylinder piston. Third sensors 58 (e.g., inertia or tilt sensors) measure an angle α between the upper link 28 and the vehicle horizontal 22. Fourth sensors 60 (for example, force sensing bolts, bending rod) measure a tensile force at lower link 34. Fifth sensors 62 (i.e., a sensor that is already present for measuring the angle between the lift arm 42 and the vehicle horizontal 22) measure the lift height of the hitch 20. Sixth sensors 64 measure a holding force $F_O$ of the upper link 28. For example, they can measure the pressure in the case of a hydraulic upper link 28. In each case, according to the present embodiment for determining the weight of the cargo load or the implement 26, individual ones of said sensors can be omitted so that various arrangements with a different combination of sensors for conducting the method for determining the weight or a mass derived therefrom can result. The measurement values provided by the sensors are sent to a control device for further processing. Said control device undertakes at the same time an averaging of the measurement data to compensate otherwise unaccounted rotary inertial forces that are induced by dynamic oscillations.

Figure 2:
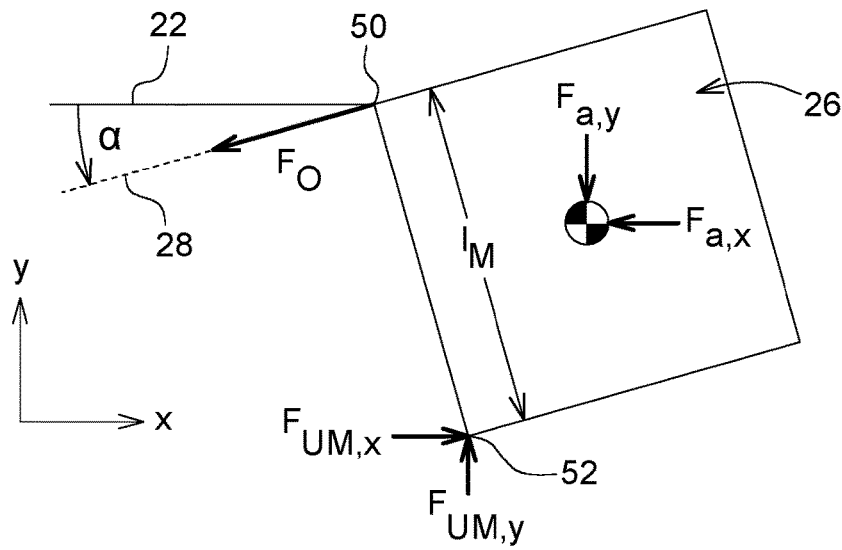
FIG. 2 shows a force diagram of the implement.

FIG. 2 schematically shows the implement 26 attached to the three-point hitch 20, with the forces arising there. The x component $F_{a,x}$ and y component $F_{a,y}$ of the weight or inertial force, which is designated by $F_a$, and which arise at the center of gravity of the implement 26, are represented, where the inertial force results from the addition of the weight and vertical accelerations that may arise due to vehicle movement. In addition, a holding force $F_O$ of the upper link 28 arises at the upper link articulation point 50 at an angle α to the vehicle horizontal 22. A supporting force $F_{UM}$, with its two force components $F_{UM,x}$ and $F_{UM,y}$, arises at the lower link articulation point 52. A mast height is indicated by $l_M$.

By means of the equilibria of forces in the x and y direction in FIG. 2, the following equations can be derived for a determination of the weight $F_a$ or the mass $m_A$ of the implement 26:

$$0 = F_{UM,x} - F_{a,x} - F_O \cdot \cos \alpha \tag{1}$$

$$0 = F_{UM,y} - F_{a,y} - F_O \cdot \sin \alpha \tag{2}$$

Here, the following equations are valid for the x and y components of the weight $F_a$:

$$F_{a,x} = m_A \cdot a_x \tag{3}$$

$$F_{a,y} = m_A \cdot a_y \tag{3}$$

Because of various slope gradients of the utility vehicle and additionally arising acceleration components during vehicle travel, variable acceleration components $a_x$ and $a_y$, which are the same for all considered objects, may result. They already contain the acceleration due to gravity and are registered by the sensors 54 affixed to the support structure 32.

In a first embodiment, the upper link holding force $F_O$ and the angle α of the upper link 28 are determined by means of the sensor means 64 and 58. A determination of the support force $F_{UM}$ or its x and y components at articulation point 52 is not necessary. Thus, the corresponding sensors 60 on support bearing 36 can be omitted. Instead, the two force components $F_{UM,x}$ and $F_{UM,y}$ are correlated with other physical relationships. The instantaneous equilibrium about the support bearing 36 on lower link 34 is suitable for this. The following equations, which contain the force components $F_{UM,x}$ and $F_{UM,y}$ as unknowns, result from FIG. 3:

$$0 = M(F_{US}) + M(F_{UI}) + M(F_{UM}) \tag{5}$$

with $$M(F_{US}) = F_{US} \cdot l_1 \cdot (\cos \varphi_S \cdot \cos \varphi_U - \sin \varphi_S \cdot \sin \varphi_U) \tag{6}$$

$$M(F_{UI}) = -r_{UI} \cdot (F_{UI,x} \cdot \sin \varphi_U + F_{UI,y} \cdot \cos \varphi_U) \tag{7}$$

$$M(F_{UM}) = -l_U \cdot (F_{UM,x} \cdot \sin \varphi_U + F_{UM,y} \cdot \cos \varphi_U) \tag{8}$$

Equations (6) through (8) can be substituted into equation (5). Then, by means of the equations (1) to (4), the mass $m_A$ or the corresponding weight $F_a$ can be determined.

Figure 3:
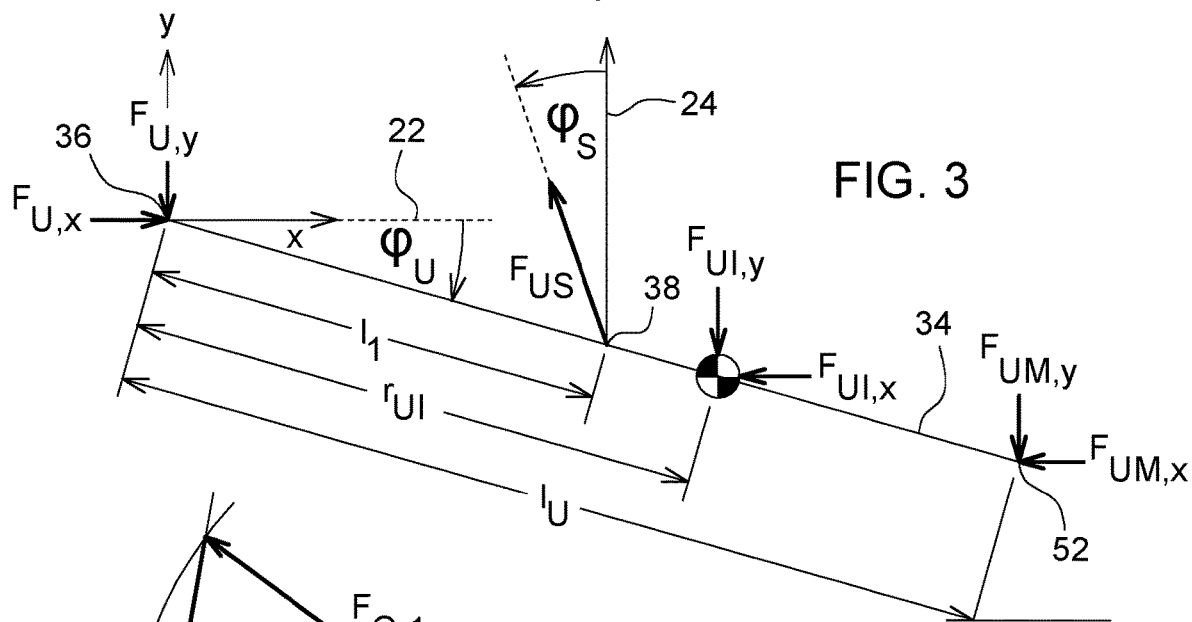
FIG. 3 shows a force diagram of the lower link on the hitch.

In this case, the force components $F_{UI,x}$ and $F_{UI,y}$, the angles $\varphi_S$ and $\varphi_U$, and the force $F_{US}$ may still be determined. The force components $F_{UI,x}$ and $F_{UI,y}$ can be measured by means of an acceleration sensor disposed on the lower link 34 (FIG. 3). The angles $\varphi_S$ and $\varphi_U$ can be calculated from the geometry of the hitch and the lift height (extension) of the lift cylinder. The lift height can be measured in particular by capacitive means and is already normally available via a data bus (for example CAN bus) of the utility vehicle 10.

For the force $F_{US}$ to be calculated, the following equations can be determined by means of FIG. 4:

$$F_{US,x} = F_{SH,x} + F_{SI,x} \tag{9}$$

$$F_{US,y} = F_{SH,y} - F_{SI,y} \tag{10}$$

and $$F_{SH,x} = F_{SH} \cdot \sin \varphi_S \tag{11}$$

$$F_{SH,y} = F_{SH} \cdot \cos \varphi_S \tag{12}$$

The force components $F_{SI,x}$ and $F_{SI,y}$ are provided by an acceleration sensor on the hub spindle 40 (FIG. 4). The force $F_{SH}$ can be calculated by means of the forces arising on lift arm 42 in FIG. 5, as follows:

$$F_{SH} = (M_Z + M_{HI})/(l_H \cdot \cos \varphi_H \cdot \cos \varphi_H - l_H \cdot \sin \varphi_H \cdot \sin \varphi_H) \tag{13}$$

with $$M_Z = -F_{Z,x} \cdot (\sin \varphi_H \cdot r_{HZ,x} + r_{HZ,y} \cdot \cos \varphi_H) - F_{Z,y} \cdot (\cos \varphi_H \cdot r_{HZ,x} - r_{HZ,y} \cdot \sin \varphi_H) \tag{14}$$

$$M_{HI} = -F_{HI,x} \cdot (r_{SH,x} \cdot \sin \varphi_H - r_{SH,y} \cdot \cos \varphi_H) - F_{HI,y} \cdot (-r_{SH,x} \cdot \cos \varphi_H + r_{SH,y} \cdot \sin \varphi_H) \tag{15}$$

and $$F_{Z,x} = F_Z \cdot \sin \vartheta \tag{16}$$

$$F_{Z,y} = F_Z \cdot \cos \vartheta \tag{17}$$

The angle $\varphi_H$ forms the angle between the lift arm 42 and the vehicle horizontal 22. Said angle $\varphi_H$ can be calculated from the geometry of the hitch 20 and the lift height (extension) of the lift cylinder. The force components $F_{HI,x}$ and $F_{HI,y}$ are provided by an acceleration sensor on the lift arm 42 (FIG. 5).

Lastly, the force $F_{US}$ is calculated in dependence on the force $F_z$ in lift cylinder 48 and the angle $\vartheta$ between the lift cylinder 48 and the vehicle vertical 24. The force $F_z$ in lift cylinder 48 is preferably determined by measuring the hydraulic pressure in lift cylinder 48 via the sensors 56 disposed on lift cylinder 48. The angle $\vartheta$ can be determined via the geometry of the hitch 20 and the angle $\varphi_H$ in a way that is not shown here in more detail.

Thus, in the first embodiment, the angle α of the upper link 28 is measured by means of the sensors 58, the holding force $F_O$ of the upper link 28 is measured by means of the sensors 64, and the pressure ($F_Z$) in lift cylinder 48 is measured by means of the sensors 56 in order to determine the weight $F_a$ of the implement 26 or its mass $m_A$ as a function of these parameters.

In a second embodiment for determining the weight or mass of the implement 26, the sensors 64 for measuring the upper link holding force $F_O$ are omitted. Instead, the measurement values of the sensors 60 (e.g., tensile force sensors) of the force $F_U$ at support bearing 36 of the lower link 34 are taken into account. The force $F_{US}$ is again, analogous to the first embodiment, determined via the measurement of the pressure ($F_Z$) in lift cylinder 48. The force components $F_{UM,x}$ and $F_{UM,y}$ can then be explicitly calculated. This takes place with consideration of the force diagram of the lower link 34 according to FIG. 3, using the equations (5) to (8) and the following force equilibrium in the x direction:

$$F_{UM,x} = F_{U,x} - F_{UI,x} - F_{US} \cdot \sin \varphi_B \tag{18}$$

The x component $F_{U,x}$ of the tensile force $F_U$ is measured by means of sensors 60. Then, taking into account the measured angle α of the upper link 28 and the equations (1), (2), the mass $m_A$ or the weight $F_a$ can be determined.

In this embodiment therefore the angle α of the upper link 28 is measured by means of the sensors 58, the tensile force $F_U$, in particular its x component $F_{U,x}$, on support bearing 36 of the lower link 34 is measured by means of the sensors 60, and the pressure ($F_Z$) in the lift cylinder 48 is measured by means of the sensors 56, in order to determine the weight $F_a$ of the implement 26 or its mas $m_A$ in dependence on these parameters.

In a third embodiment for determining the weight or mass of the implement 26, the sensors 58 for measurement of the upper link angle α are omitted. First, the force components $F_{UM}$,x and $F_{UM,y}$ are calculated analogously to the second embodiment and, in addition, the upper link holding force $F_O$ is determined via the sensors 64. After employing the corresponding equations, two possible solutions arise for the weight $F_a$ in this embodiment.

Figure 6:
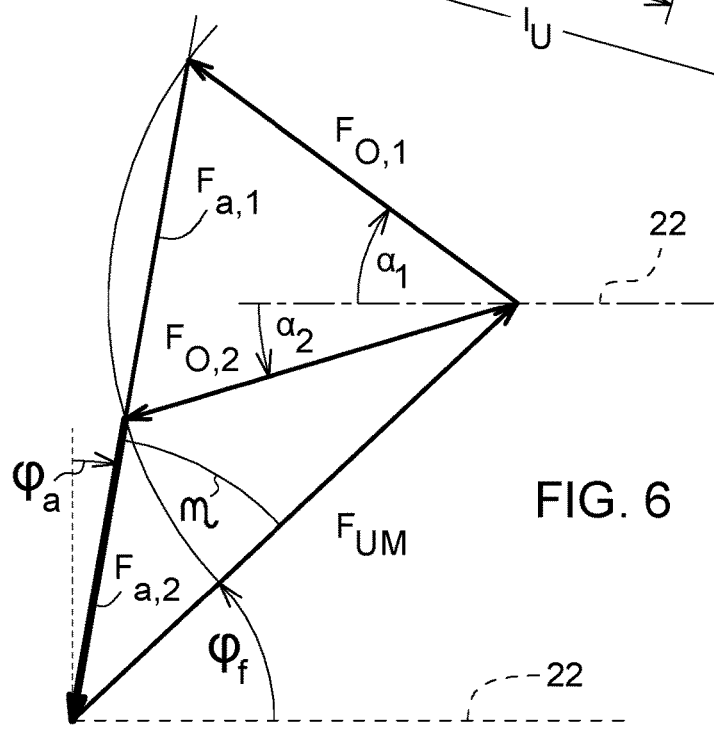
FIG. 6 shows a schematic representation of forces for determination of the weight according to one embodiment.

The two possible solutions are graphically represented in FIG. 6. The resultant from the force components $F_{UM_x}$ and $F_{UM_y}$ is designated as $F_{UM}$ and represented as a vector. The direction of the weight $F_a$ is known via the acceleration components $a_x$ and $a_y$ and is established by the angle $\varphi_a$. The contribution of the upper link holding force $F_O$ is known. However, its direction is unknown because of the missing measurement of the angle α. The possible directions are described as a circle with the radius $|F_O|$ and the center of the force vector $F_{UM}$. This circle intersects the direction of the weight $F_a$ at two points, so that two possible solutions ($F_a$, 1 and $F_a$, 2) arise for the weight $F_a$.

The calculation of the two possible weights arises through transposition of the law of cosines:

$$|F_{a,1}|=|F_{UM}\cos \eta+\sqrt{(F_{UM}\cdot\cos\eta)^2-(F^2_{UM}-F^2_O)}| \quad (19)$$

$$|F_{a,2}|=|F_{UM}\cos \eta-\sqrt{(F_{UM}\cdot\cos\eta)^2-(F^2_{UM}-F^2_O)}| \quad (20)$$

The decision of which weight or mass of the implement 26 is the correct one can be made via a plausibility assessment. For example, a second measurement can be conducted with the sensors that are used at a different lift height of the hitch 20 or a limiting of the possible angle α of the upper link 28 can be done.

When the measurement is made at a different lift height of the hitch 20, two new possible values result for the weight, of which one corresponds within measurement precision with one of the values from the first measurement. In this way, the weight or mass can be unambiguously determined.

In the case of the limiting of the upper link angle α, each of the two possible solutions in FIG. 6 can be assigned an upper link angle α1 and α2. Of these two angles, one is normally not compatible with the kinematics and geometry of the hitch 20. For a limiting of the upper link angle α that is as accurate as possible, one takes into account in particular the mast height $l_M$, the current length of the upper link 28, and the mounting position of the upper link 28 on the support structure 32.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining a weight of a payload carried by a support structure of an agricultural utility vehicle via a hitch, comprising:
   providing the hitch with at least one upper link and at least one lower link and a lift cylinder connected to the at least one lower link, and
   determining the weight based on (1) an angle between the upper link and a vehicle horizontal, (2) a holding force at a connection between the upper link and the payload effective along the upper link, (3) a force in the lift cylinder, and (4) a lift height of the hitch.

2. The method of claim 1, wherein the lift height of the hitch is determined by measuring the angle between a lift arm connecting the lift cylinder to the lower link and the vehicle horizontal.

3. The method of claim 1, further comprising:
   determining the weight based on a tensile force at a connection between the lower link and the support structure instead of being based on the holding force at the connection between the upper link and the payload.

4. A control system of an agricultural utility vehicle for determining a weight of an implement, comprising:
   the vehicle including a cabin, a front axle, an engine for driving a rear axle, and a support structure;
   a hitch mounted to the vehicle at a front or rear region thereof, the hitch including an upper link hingedly mounted to the support structure and a lower link hingedly mounted to the support structure via a support bearing;
   the implement coupled to and supported by the hitch;
   a control device; and
   a plurality of sensors coupled to the vehicle and disposed in communication with the control device, the plurality of sensors including at least a first acceleration sensor, a second sensor for detecting hydraulic pressure of a lift cylinder, a third sensor for measuring an angle between the upper link and a vehicle horizontal, a fourth sensor for measuring a tensile force at the lower link, a fifth sensor for measuring a lift height of the hitch, and a sixth sensor for measuring a holding force of the upper link;
   wherein the control device is configured to receive a measurement value from at least one of the plurality of sensors, and based on the measurement value, determine the weight based on (1) the angle between the upper link and the vehicle horizontal, (2) the holding force at a connection between the upper link and the implement, (3) the lift height of the hitch, and (4) the hydraulic pressure of the lift cylinder.

5. The control system of claim 4, further comprising:
   wherein the control device is configured to determine the weight based on the tensile force at the lower link instead of the holding force at the connection between the upper link and the implement.

* * * * *